US009849491B2

United States Patent
Della Rossa et al.

(10) Patent No.: US 9,849,491 B2
(45) Date of Patent: Dec. 26, 2017

(54) DRAWING ASSEMBLY FOR DRAWING MACHINES

(71) Applicant: DANIELI & C. OFFICINE MECCANICHE SPA, Buttrio (IT)

(72) Inventors: Flavio Della Rossa, Buttrio (IT); Fausto Menosso, Pradamano (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 0 days.

(21) Appl. No.: 15/037,951

(22) PCT Filed: Nov. 19, 2014

(86) PCT No.: PCT/IB2014/066149
§ 371 (c)(1),
(2) Date: May 19, 2016

(87) PCT Pub. No.: WO2015/075638
PCT Pub. Date: May 28, 2015

(65) Prior Publication Data
US 2016/0288182 A1  Oct. 6, 2016

(30) Foreign Application Priority Data
Nov. 19, 2013  (IT) .............................. UD2013A0153

(51) Int. Cl.
*B65G 15/14*    (2006.01)
*B21C 1/30*    (2006.01)

(52) U.S. Cl.
CPC ................ *B21C 1/30* (2013.01); *B65G 15/14* (2013.01)

(58) Field of Classification Search
CPC ........ B65G 15/14; B65G 15/12; B65G 17/42; B65G 17/44; B65H 51/14; B21C 1/30; B21C 1/28
(Continued)

(56) References Cited

U.S. PATENT DOCUMENTS 2,251,291 A * 8/1941 Reichelt ................. B65H 51/14
                                              15/104.33
2,679,924 A * 6/1954 Powell .................. B65H 51/14
                                              226/172
(Continued)

FOREIGN PATENT DOCUMENTS

WO    200114076    3/2001
WO    2009037320   3/2009

OTHER PUBLICATIONS

International Search Report, issued in the corresponding international PCT application No. PCT/IB2014/066149, dated Mar. 19, 2015, 3 pages.

*Primary Examiner* — James R Bidwell
(74) *Attorney, Agent, or Firm* — Hamre, Schumann, Mueller & Larson, P.C.

(57) ABSTRACT

A drawing assembly for drawing machines for metal products includes drawing clamps, each selectively clampable in a housing seating of a corresponding link of a track, and on a corresponding lying plane, by a corresponding rapid attachment/detachment device associated with the link. The rapid attachment/detachment device includes at least a clamping element and an activation element, wherein the clamping element includes at least a segment having a cam profile able to cooperate with a mating cam surface of the activation element. The activation element is mobile in a direction of thrust, orthogonal to the median axis of the clamping element, and slides in a hollow with the mating cam surface in contact with the cam profile of the clamping element.

7 Claims, 2 Drawing Sheets

(58) Field of Classification Search
USPC .............. 198/604, 620, 626.1, 626.5, 867.15
See application file for complete search history.

(56) References Cited

U.S. PATENT DOCUMENTS

| | | | | |
|---|---|---|---|---|
| 4,013,205 | A * | 3/1977 | Fabre-Curtat | ........ B62D 55/253 |
| | | | | 226/173 |
| 5,094,340 | A * | 3/1992 | Avakov | ................ B65G 37/005 |
| | | | | 198/604 |
| 6,189,609 | B1 * | 2/2001 | Shaaban | ................ E21B 19/22 |
| | | | | 166/384 |
| 6,425,441 | B2 * | 7/2002 | Shaaban | ................ E21B 19/22 |
| | | | | 166/384 |
| 6,644,467 | B1 * | 11/2003 | Chiuch | ..................... B21C 1/30 |
| | | | | 198/626.1 |
| 6,851,549 | B1 * | 2/2005 | Beringer | ................ B65G 17/44 |
| | | | | 198/803.14 |
| RE43,410 | E * | 5/2012 | Goode | ................... E21B 19/22 |
| | | | | 166/77.3 |
| 9,371,706 | B2 * | 6/2016 | Gubbins | ................ E21B 19/22 |

\* cited by examiner

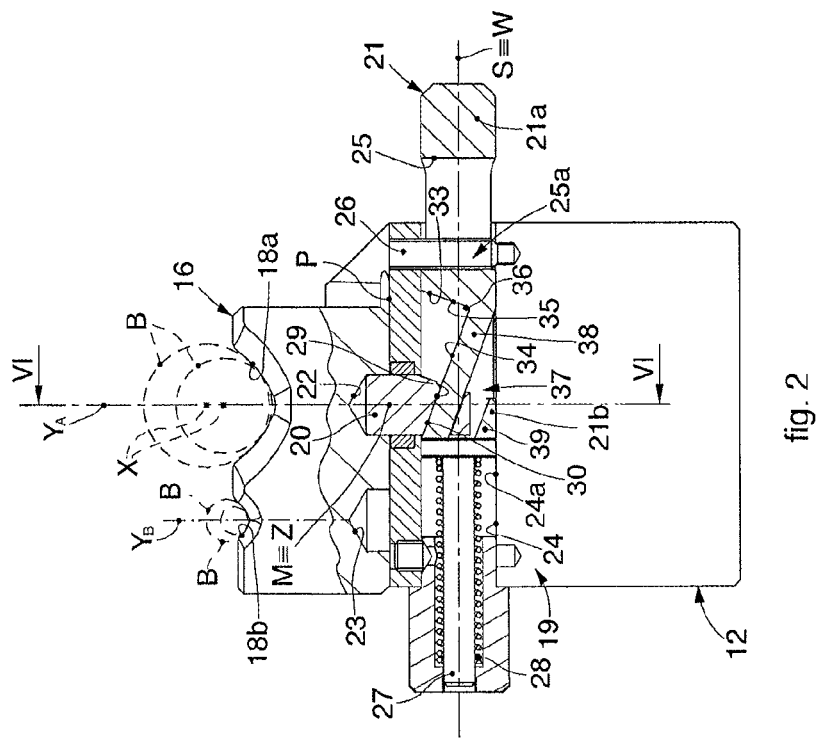
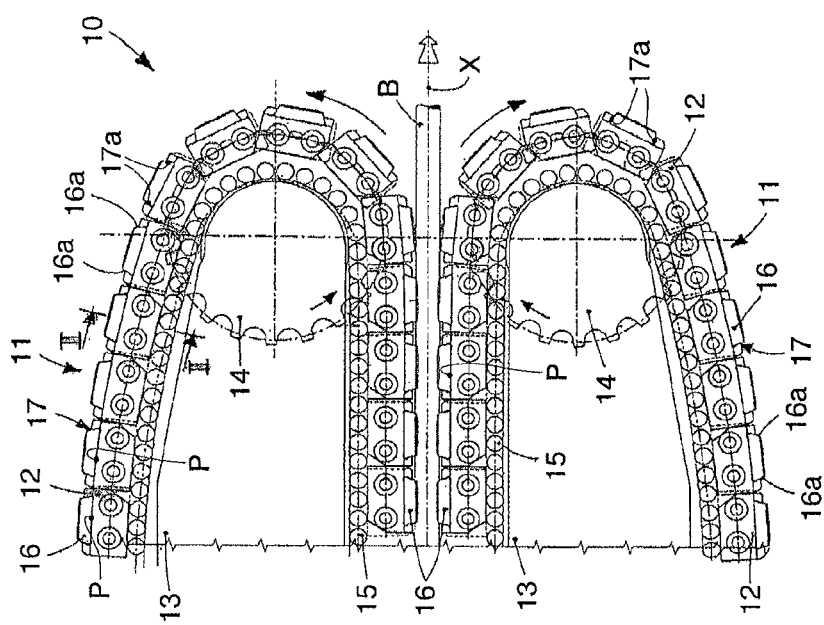

DRAWING ASSEMBLY FOR DRAWING MACHINES

FIELD OF THE INVENTION

The present invention concerns a drawing assembly for drawing machines for metal products, such as solid or tubular metal bars. In particular, the drawing assembly according to the invention is the generally continuous type and comprises at least two tracks opposite each other and rotating in opposite directions, each comprising a plurality of links disposed in sequence with respect to each other and able to clamp the metal products to achieve the axial drawing.

BACKGROUND OF THE INVENTION

Drawing machines are known for metal products, such as solid or tubular bars, which comprise a drawing assembly provided with two counter-rotating tracks, opposite each other with respect to a drawing axis.

Each track includes a plurality of links, constrained to each other in sequence, on each of which a drawing clamp is mounted which, during use, presses against at least one bar subjected to drawing.

In particular, each drawing clamp of one track cooperates with a corresponding drawing clamp present on the opposite track in order to clamp the bar subjected to drawing from opposite sides, in a segment that has already been drawn.

Each clamp is provided with a recess, which is shaped specifically and coordinated with respect to the cross section of the bar in the segment that has already been drawn.

In this way, the bar to be drawn is clamped between two recesses of two opposite clamps, and the rotation of the two tracks performs the clamping and substantially continuous drawing of the bar, to carry out the drawing process.

The drawing clamps are removable from the respective links, so they can be completely removed in the event of wear or if the section of the bar to be drawn is varied.

It is known to produce a high number of different series of replaceable drawing clamps, normally 4-5 series for solid bars and 10 or more series for tubular products.

Each series of drawing clamps has the corresponding recess with sizes that differ from one series to the other, so that each series of drawing clamps is suitable to clamp efficiently a coordinated range of bars with different diameters.

Each drawing clamp can be selectively clamped inside a housing seating made in the corresponding link by corresponding rapid attachment/detachment means associated to the link, an example of which is shown in WO 01/14076 A1.

A solution is also known, from WO-A-2009/037320 (WO'320) in the name of the present Applicant, in which each drawing clamp comprises two or more recesses with different sizes from each other, and in each of which a determinate range of cross sections of the metal products to be subjected to drawing is able to be positioned. In this way it is obtained that the same clamp, with at least two recesses of different sizes, positioned for example adjacent to each other in a transverse direction with respect to the drawing axis, is able to guarantee the efficient clamping of at least two different ranges in size of metal product subjected to drawing. To pass from one range in size to another, it is sufficient to translate the clamps, or more generally move them, with respect to the link, in order to align the desired recess with the drawing axis and with the product subjected to drawing.

Drawing assemblies are known in which each link comprises a rapid attachment/detachment device, provided with a central clamping element and a corresponding activation element, to clamp the corresponding clamp inside the housing seating stably and removably.

For example, in the rapid attachment/detachment device described in the above application WO'320, the clamping element is a ball, while the activation element is defined by a thruster comprising in its upper part a cavity with a substantially semi-spherical shape, which functions as a cam profile for positioning the ball.

The solution described in this document, although efficient and precise in allowing a rapid change of the drawing clamps, and also able to considerably reduce the times and costs of replacement and maintenance of the drawing clamps, may be subject as time passes to bevels and plays occurring between the ball and the link. Furthermore, the ball may not guarantee a totally secure and precise positioning of the drawing clamp because of the fact that its portion that protrudes from the link, and causes the interference needed to maintain the position of the drawing clamp, is reduced (generally in the order of 2-3 mm). Moreover, with use, there is also the risk that the ball may deform and become oval. This can negatively affect the correct positioning along the drawing axis of the recess being used.

It is also known that it is necessary to carry out the detachment of the drawing clamps from the respective link of the track rapidly and safely.

One purpose of the present invention is to provide a drawing assembly for drawing machines that allows to clamp efficiently bars with different cross sections and/or sizes, and which has drawing clamps able to guarantee attachments and detachments that are safe under all conditions of use, retaining efficiency even as time passes and after long periods of use.

Another purpose of the present invention is to obtain a drawing assembly in which replacing the drawing clamps is rapid and easy, with lower costs and times of both production and management than the state of the art.

Another purpose of the present invention is to provide a drawing assembly for drawing machines that is compact and in which it is possible to replace or move the drawing clamps independently of the position of the links along each of the tracks, in order to clamp bars with cross sections of different shapes and/or sizes efficiently.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a drawing assembly according to the present invention can be used as part of drawing machines for metal products and comprises drawing clamps, each selectively clampable, by corresponding rapid attachment/detachment means associated with a link of a track, in a housing seating of the link, and on a corresponding lying plane. The rapid attachment/detachment device comprise at least a clamping element having a median axis and an activation element developing along a longitudinal axis, substantially orthogonal to the median axis.

The clamping element comprises at least a segment having a cam profile able to cooperate with a mating cam surface of the activation element. The activation element is mobile in a direction substantially orthogonal to the longitudinal axis of the clamping element between a first position in which the clamping element is in an active position and clamps a drawing clamp to a corresponding link, and a second position, in which the clamping element is in an inactive position and frees the clamp from the link.

According to a characteristic feature of the present invention, the clamping element comprises a hollow inside which the activation element slides, with its cam surface in contact with the cam profile of the clamping element.

The cam profiles of both the clamping element and the activation element are defined by flat supporting and sliding walls, angled with respect to the direction of thrust of the activation element and substantially parallel with respect to each other.

In this way the advantage is obtained of obtaining a mechanical coupling of the clamping element and the activation element, thanks to the sliding of the angled flat walls and the containing and guide action of the hollow with respect to the activation element. The motion of the clamping element, moreover, is not constrained by the force of gravity, and depends on the mechanical guide determined by the relative sliding of the cam or support profile of the clamping element on the cam or sliding surface of the activation element while the latter slides in the hollow.

Another advantage of the present invention is that the inclined cam, also but not only because it is inserted in the hollow, defines a stable and continuous guide for the movement of the clamping element, giving safety of the actual movement of the latter if the activation element should move.

In one solution of the invention, the hollow is defined by the flat support wall and by a mating inclined wall, positioned on opposite sides of the hollow, for example above and below it, and joined by a bottom wall, transverse to them both.

In another solution, the inclined wall is substantially parallel to the cam profile mentioned above.

According to one feature of the present invention, the activation element comprises at least a first maneuvering portion and a second shaped portion, the latter slidable inside the hollow of the clamping element and provided along its whole extension with a sliding throat, delimited by the sliding wall and by an abutment wall, contiguous to the maneuvering portion, the sliding flat wall and the abutment wall being reciprocally converging into a terminal segment defining the terminal portion of the sliding throat.

In some forms of embodiment, the activation element slides inside a sliding cavity made in the corresponding link, and the shaped portion comprises a support appendix, configured to rest on the perimeter wall of the sliding cavity, in order to support the activation element during its sliding motion and to confer stability to the movement of the activation element inside the sliding cavity.

BRIEF DESCRIPTION OF THE DRAWINGS

These and other characteristics of the present invention will become apparent from the following description of some forms of embodiment, given as a non-restrictive example with reference to the attached drawings wherein:

FIG. 1 is a partial lateral view of a drawing assembly according to the present invention;

FIG. 2 is a cross section from II to II of the drawing assembly in FIG. 1, in an operating condition;

Figure 4:
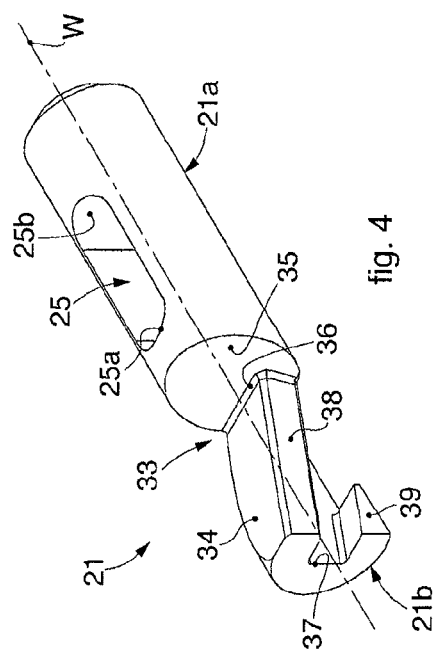
FIG. 4 is a three-dimensional view of a component of the drawing assembly in FIG. 2.

In the following description, the same reference numbers indicate identical parts of the drawing assembly according to the present invention, also in different forms of embodiment. It is understood that elements and characteristics of one form of embodiment can be conveniently incorporated into other forms of embodiment without further clarifications.

DETAILED DESCRIPTION OF SOME FORMS OF EMBODIMENT

We shall now refer in detail to the various forms of embodiment of the present invention, of which one or more examples are shown in the attached drawings. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

FIG. 1 is used to described forms of embodiment of a drawing assembly 10 according to the present invention, which can be installed in a drawing machine for metal products, such as for example bars B.

The drawing machine is the known type and therefore is not shown in the attached drawings.

The drawing assembly 10 can be configured to draw a bar B to be drawn along a drawing axis X.

In some forms of embodiment, the drawing assembly 10 can include a pair of tracks 11 reciprocally counter-rotating and disposed symmetrical and opposite each other with respect to the drawing axis X, for example above and below the latter.

Each track 11 can include a plurality of links 12, constrained to each other by means of suitable articulations, and on each of which a corresponding drawing clamp 16 can be selectively mounted.

The two tracks 11, in a known manner, can be mounted on respective rigid support plates 13, and made to rotate continuously by toothed wheels 14 cooperating with the links 12.

An intermediate chain 15 is interposed, for example of the type with rollers, between each track 11 and the respective support plate 13

The rotation of the tracks 11 can be intended to take pairs of opposite drawing clamps 16, belonging to the two tracks 11, into contact with the bar B, in order to exert an action of pressure on the bar B and impart to it a desired drawing traction along the drawing axis X.

Each drawing clamp 16 can be conventionally provided with two front faces 16a, inclined, convergent and positioned on opposite sides of the drawing clamp 16.

The front faces 16a can be configured to couple with peripheral walls 17a of a corresponding housing seating 17 conformed in a dovetail, made through transversely with respect to the drawing axis X in each of the links 12 to house a corresponding drawing clamp 16.

The dovetailed couplings between the links 12 and the corresponding drawing clamps 16 determine a constraint that prevents both the accidental fall of the drawing clamps 16 during use, and also the longitudinal extraction thereof in a direction parallel to the drawing axis X and in the direction of movement of the tracks 11.

Each housing seating 17 can also define a lying plane P of the corresponding drawing clamp 16.

In possible solutions, the lying plane P can be parallel to the drawing axis X.

FIG. 2 is used to describe forms of embodiment in which each drawing clamp 16 can be provided with two or more hollows made through in a direction joining the front faces 16a.

Figure 3:
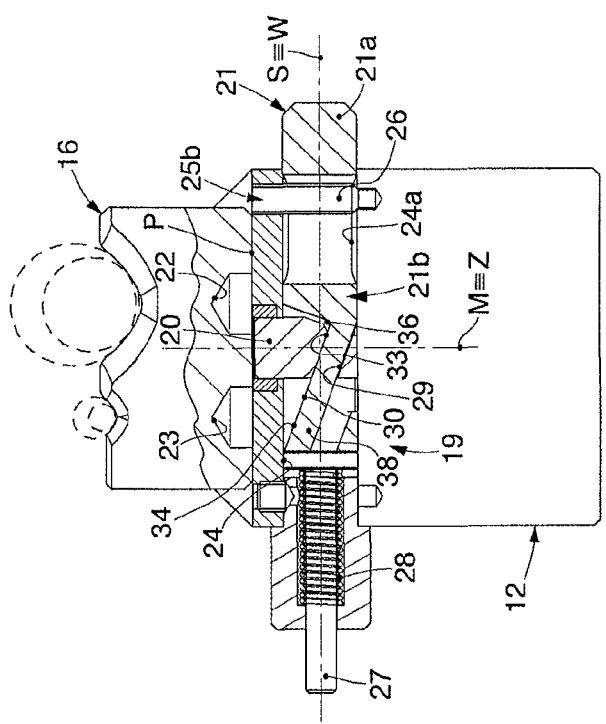
FIG. 3 is a cross section from II to II of the drawing assembly in FIG. 1, in an non-operating condition.

Example solutions shown in FIGS. 2 and 3 provide that the drawing clamp 16 can include a first recess 18a and a second recess 18b, of different sizes and coordinated with different ranges of size of bars B to be drawn.

The recesses 18a and 18b can have cross sections symmetrical to respective axes of symmetry $Y_A$ and $Y_B$.

In one operating condition it can be provided that one recess 18a or 18b is in a work position and that the other recess 18b, or 18a is in an inactive position.

In the case of FIG. 2, the first recess 18a is in the work position, that is, positioned so that its axis of symmetry $Y_B$ is orthogonal and co-planar with respect to the drawing axis X.

Each recess 18a or 18b is also longitudinally aligned, in the work position, with the drawing axis X and cooperates with a corresponding recess 18a or 18b of the drawing clamp 16 of the opposite track 11, in order to grip, as indicated above, a segment of the bar B.

In this way, the bar B is drawn by the tracks 11 during the drawing process.

In some forms of embodiment, which can be combined with forms of embodiment described here, each link 12 can include a rapid attachment/detachment device 19 configured both to stably clamp each drawing clamp 16 to the respective link 12, in the operating condition of the drawing assembly 10, and also to release the drawing clamp 16 from the link 12 in the non-operating condition of the drawing assembly 10.

In the non-operating condition, the release of the drawing clamp 16 can allow it to be removed from the housing seating 17, and also to be moved, for example transversely on the lying plane P, in order to replace the recess 18a or 18b in the work position with the recess 18b or 18a that is to be put in that position.

The rapid attachment/detachment device 19 can include a pin 20 which functions as a clamping element, and a thruster 21 which performs the function of selective activation and de-activation element of the pin 20.

In some example forms of embodiment, described with reference to the attached drawings, the pin 20 can have a substantially cylindrical shape.

It may also be provided that the pin 20 develops along a longitudinal axis Z that normally, in use, is substantially vertical.

The drawing clamp 16 can include two or more clamping seatings, in this case given by way of example a first blind hole 22 and a second blind hole 23, made in the portion of the drawing clamp 16 opposite that where there is the first recess 18a and the second recess 18b.

The thruster 21 is configured to make the pin 20 assume at least an active position, in which the pin 20 is inserted in either the first blind hole 22 or the second blind hole 23, and an inactive position, in which the pin 20 is outside both the first blind hole 22 and the second blind hole 23.

In the active position, the pin 20 can be put in contact with the perimeter walls of one of the blind holes 22, 23, to determine the clamping of the drawing clamp 16.

In particular, the first blind hole 22 allows to determine both the clamping of the drawing clamp 16 and also the simultaneous positioning of the first recess 18a in the work position.

In the same way, the second blind hole 23 allows to determine both the clamping of the drawing clamp 16 and also the simultaneous positioning of the second recess 18b in the work position.

FIG. 2 is used to show an example operating condition of the drawing assembly 10, in which the pin 20 is activated and inserted in the first blind hole 22.

FIG. 3 is used to show, by way of example, a non-operating condition of the drawing assembly 10, in which the pin 20 is in the inactive position.

The thruster 21 is configured to selectively determine the activation and de-activation of the pin 20, moving it along its longitudinal axis Z and along an axis of movement M essentially orthogonal to the drawing axis X and the lying plane P of the drawing clamp 16. The activation corresponds to the insertion of the pin 20 into one of the blind holes 22, 23, while the de-activation of the pin 20 corresponds to the dis-insertion thereof from the blind holes 22, 23.

The thruster 21 is in turn able to slide inside a sliding cavity 24 made through in the link 12, in a direction of thrust S essentially parallel to the lying plane P and hence substantially orthogonal to the axis of movement M of the pin 20 and its longitudinal axis Z.

The thruster 21 can have an oblong shape, for example at least partly cylindrical, developing along a longitudinal axis W. In use, the longitudinal axis W is located parallel or coincident with the direction of thrust S.

In possible solutions, the thruster 21 can be provided with a maneuvering portion 21a and a shaped zone 21b, the first substantially defining the part of the thruster 21 which is maneuvered to make it slide inside the sliding cavity 24, and the second defining the part of the thruster 21 in contact with the pin 20 to move it as indicated above.

In possible forms of embodiment, the maneuvering portion 21a can include a longitudinal through slot 25 developing along the longitudinal axis W and, during use, in the direction of thrust S, and comprising a first end portion 25a and a second end portion 25b, reciprocally opposite longitudinally.

The rapid attachment/detachment device 19 can comprise a catch 26, for example a peg, a pin or a screw element, inserted into the through slot 25 and attached to the link 12.

The thruster 21, sliding in the direction of thrust S, can assume a clamped position (FIG. 2), in which the first end portion 25a of the longitudinal through slot 25 is in contact with the catch 26.

Furthermore, in the direction of thrust S, the thruster 21 can also assume a release position (FIG. 3), in which the catch 26 is positioned in contact with or at least in close proximity to the second end portion 25b of the longitudinal through slot 25.

FIGS. 2 and 3 can be used to describe forms of embodiment in which elastic return means, for example a plunger 27 thrust by a spring 28, can be associated to the sliding cavity 24 in which the thruster 21 slides.

The plunger 27 and the spring 28 can be at least partly inside the sliding cavity 24, and the plunger 27 can be thrust by the spring 28 constantly in contact with the shaped portion 21b of the thruster 21.

The plunger 27 and the spring 28 can have an axial action in the direction of thrust S and be configured to constantly exert a force on the thruster 21, to keep it normally in a clamped position.

A displacement of the thruster 21 in the direction of thrust S determines the compression of the spring 28, a displacement of the plunger 27 and the passage of the thruster 21 to the release position.

During the displacement of the thruster 21, the pin 20 slides with relative motion along the thruster 21, in particular along its shaped portion 21b, and with absolute motion along the axis of movement M, as will become clear hereafter in the description.

In some forms of embodiment, the shaped portion 21b can include a support appendix 39, configured to rest on a perimeter wall 24a of the sliding cavity 24, to support the thruster 21 during its sliding motion in the direction of thrust S and to confer stability to said motion.

With reference to FIGS. 2 to 4, the pin 20 can be provided, in one segment, with a hollow 29, made through along the pin 20 transversely to the median axis Z.

The hollow 29 can be substantially C-shaped and delimited by a support wall 30, which defines an inclined cam profile, and by an inclined wall 31, parallel to the support wall 30 and connected thereto by a bottom wall 32.

Figure 5:
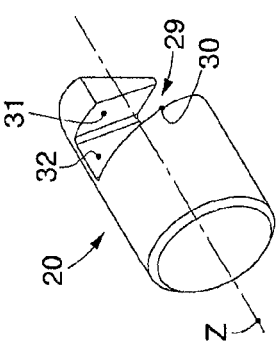
FIG. 5 is a three-dimensional view of another component of the drawing assembly in FIG. 2.

FIG. 5 can be used to describe forms of embodiment of the thruster 21 in which the shaped portion 21b can be provided with a sliding throat 33, which involves the whole extension as far as the maneuvering portion 21a.

The sliding throat 33 can be concave, for example substantially V-shaped, and can be delimited by a first inclined wall or sliding wall 34, and by a second inclined wall or abutment wall 35, contiguous to the maneuvering portion 21a.

The sliding wall 34 and the abutment wall 35 can be reciprocally inclined, for example substantially orthogonal to each other, and converging into a terminal segment 36.

Other forms of embodiment can provide a substantially U-shaped sliding throat, in which the terminal segment 36 is defined by the terminal portion of the concavity of the shape.

The sliding wall 34 can be inclined with respect to the longitudinal axis W, and rotated with respect to a plane parallel to the lying plane P on which the drawing clamp 16 lies, by an angle equal to the angle of inclination of the hollow 29 of the pin 20 with respect to the median axis Z of the latter.

In possible implementations, the terminal segment 36 can lie on a plane parallel to the lying plane P.

In some forms of embodiment, the thruster 21 can also include a diagonal groove 37, parallel to the sliding wall 34 and made through in the shaped portion 21b.

The shaped portion 21b is configured so that the sliding throat 33 and the diagonal groove 37 are positioned on opposite sides with respect to a segment or guide part 38, of which the sliding wall 34 defines the part facing upward with the function of a cam surface for the sliding of the cam profile defined by the support wall 30 of the pin 20.

In possible solutions, the diagonal groove 37 can be interposed between the guide part 38 and the support appendix 39.

Figure 6:
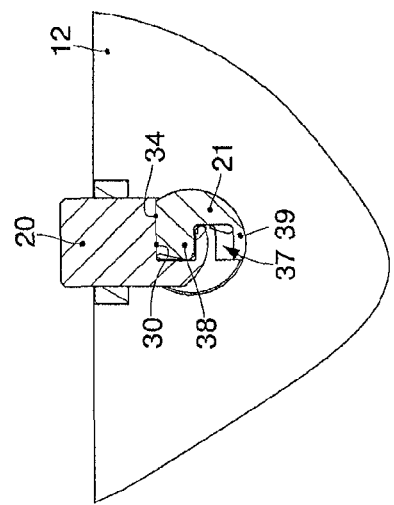
FIG. 6 is a section from VI to VI of FIG. 2.

With reference to FIGS. 2, 3 and 6, the assembly of the rapid attachment/detachment device 19 provides that the guide part 38 of the thruster 21 is inserted into the hollow 29 of the pin 20, so that the sliding wall 34 and the support wall 30 are located in reciprocal contact.

The whole is then inserted into the sliding cavity 24 made in the link 12, where the spring 28 and the plunger 27 are already present.

The thruster 21 is positioned so that the shaped portion 21b is in contact with the plunger 27 and the maneuvering portion 21a protrudes from the link 12, and is clamped in position by inserting the catch 26 into the longitudinal through slot 25 and by attaching it to the body of the link 12.

The spring 28 and plunger 27 press against the thruster 21 to keep it, as we said, in the clamped position, which determines the activation of the pin 20, which is positioned at one end of the guide part 38, in correspondence with the terminal part of the sliding wall 34 opposite the terminal segment 36 of the sliding throat 33 and consequently thrust and inserted into one of the blind holes 22, 23.

When the thruster 21 is thrust in the direction of thrust S, compressing the spring 28, the pin 20 slides on the sliding wall 34 toward the bottom of the sliding throat 33, away from the drawing clamp 16, along the axis of movement M.

When this movement is complete, the thruster 21 is in the release position and the pin 20 has emerged from the blind hole 22, 23 in which it was previously inserted, releasing the drawing clamp 16.

Once the blind hole 22, 23 corresponding to the recess 18a, 18b that is to be used has been aligned with the pin 20, the inverse passage from the release position to the clamped position of the thruster 21 is automatically obtained, due to the effect of the thrust by the spring 28 and the plunger 27 on the thruster 21.

During the movement of the thruster 21 from the clamped position to the release position and vice versa, the activation and de-activation of the pin 20, that is, the insertion and removal of the pin 20 from the blind hole 22, 23, is advantageously the purely mechanical type, thanks to the constraint created between the guide part 38 and the hollow 29. The motion of the pin 20 along the axis of movement M does not in fact depend on the force of gravity, but strictly on the mechanical guide determined by the sliding of the support wall 30 on the sliding wall 34.

Furthermore, the safety of the actual movement of the pin 20 following the displacement of the thruster 21 is guaranteed by the fact that the guide part 38, inserted in the hollow 29, defines a stable and continuous guide for said movement.

It is clear that modifications and/or additions of parts may be made to the drawing assembly 10 as described heretofore, without departing from the field and scope of the present invention.

It is also clear that, although the present invention has been described with reference to some specific examples, a person of skill in the art shall certainly be able to achieve many other equivalent forms of drawing assembly, having the characteristics as set forth in the claims and hence all coming within the field of protection defined thereby.

The invention claimed is:

1. A drawing assembly for drawing machines for metal products, comprising: drawing clamps, each selectively clampable in a housing seating of a corresponding link of a track, by means of corresponding rapid attachment/detachment device said rapid attachment/detachment device comprising at least a clamping element and an activation element, said clamping element comprising a cam profile able to cooperate with a mating cam surface of a guide portion of the activation element, and said activation element being mobile in a direction of thrust, substantially orthogonal to a longitudinal axis of said clamping element, between a first position, in which said clamping element is in an active position and clamps one of said drawing clamps to a corresponding link, and a second position, in which said clamping element is in an inactive position and frees said clamp from the link, and wherein said cam profile of the clamping element comprises a flat support wall angled with respect to said direction of thrust and said mating cam surface of the activation element comprises a sliding flat wall, also angled with respect to said direction of thrust and substantially parallel to said sliding flat wall, wherein said clamping element comprises a hollow inside which said guide portion of the activation element slides in a guided manner, with said sliding flat wall in contact at a top with said flat support wall of the clamping element, wherein said hollow is defined by said flat support wall and by a mating inclined wall, positioned on opposite sides of said hollow and joined by a bottom wall, transverse to them both, and wherein said mating inclined wall is essentially parallel to said flat support wall.

2. The drawing assembly as in claim 1, wherein the activation element comprises at least a maneuvering portion, essentially cylindrical, and a shaped portion, provided along its whole extension with a sliding throat, delimited by said sliding flat wall and by an abutment wall, contiguous to said maneuvering portion, said sliding flat wall and said abutment wall being reciprocally converging into a terminal segment defining a terminal portion of said sliding throat.

3. The drawing assembly as in claim 2, wherein said shaped portion of said activation element comprises a diagonal groove, having a development parallel to said sliding flat wall and made in said shaped portion, said diagonal groove and said sliding throat being reciprocally opposite said terminal segment of said activation element.

4. The drawing assembly as in claim 2, wherein said shaped portion comprises a support appendix, configured to rest on a perimeter wall of a sliding cavity, made through in said corresponding link, to support the activation element during its sliding motion in the direction of thrust and to confer stability to said sliding motion.

5. The drawing assembly as in claim 1, wherein each link comprises a sliding cavity, having a development along said direction of thrust, and said rapid attachment/detachment device comprises elastic return means, said sliding cavity being configured to contain said activation element and at least partly said elastic return means, wherein said elastic return means contact said activation element and exert thereon a thrust in said direction of thrust in order to keep said activation element normally in said first position.

6. The drawing assembly as in claim 2, wherein said shaped portion comprises a support appendix, configured to rest on a perimeter wall of a sliding cavity, to support the activation element and confer stability to the sliding motion of said activation element in the direction of thrust.

7. The drawing assembly as in claim 2, wherein said maneuvering portion includes a longitudinal through slot with a development in said direction of thrust and comprising a first end portion and a second end portion, and wherein said rapid attachment/detachment device comprises a catch, inserted in said longitudinal through slot and attached to the corresponding link, wherein said activation element has a clamped position in which the first end portion of the longitudinal through slot is in contact with the catch and a release position in which the catch is positioned in contact with or at least in close proximity to the second end portion of the longitudinal through slot.

\* \* \* \* \*